United States Patent
Blanchard et al.

(10) Patent No.: US 9,758,237 B2
(45) Date of Patent: Sep. 12, 2017

(54) AIRCRAFT WIRE FAIRING

(75) Inventors: Jack Blanchard, Bristol (GB);
Anthony Bryant, Bristol (GB);
Andrew Gollin, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 392 days.

(21) Appl. No.: 12/793,761

(22) Filed: Jun. 4, 2010

(65) Prior Publication Data

US 2010/0308169 A1 Dec. 9, 2010

(30) Foreign Application Priority Data

Jun. 4, 2009 (GB) .................................. 0909605.8

(51) Int. Cl.
| | |
|---|---|
| *B64C 7/00* | (2006.01) |
| *B29C 45/14* | (2006.01) |
| *B29C 70/86* | (2006.01) |
| *B29L 31/30* | (2006.01) |

(52) U.S. Cl.
CPC .......... *B64C 7/00* (2013.01); *B29C 45/14639* (2013.01); *B29C 70/86* (2013.01); *B29L 2031/3076* (2013.01); *B64D 2221/00* (2013.01); *Y02T 50/433* (2013.01)

(58) Field of Classification Search
CPC ..... B64C 7/00; B29C 45/14639; B29C 70/86; Y02T 50/433; B29L 2031/3076; B64D 2221/00

USPC .................................. 244/119, 134 R, 99.11
See application file for complete search history.

(56) References Cited

U.S. PATENT DOCUMENTS

| | | | | |
|---|---|---|---|---|
| 2,686,640 | A | * | 8/1954 | Neel, Jr. et al. .......... 244/134 D |
| 2,930,554 | A | * | 3/1960 | Johnson ................. B64D 15/16 |
| | | | | 244/134 R |
| 3,484,583 | A | * | 12/1969 | Shaw, Jr. ...................... 219/522 |
| 6,000,977 | A | * | 12/1999 | Haake ........................... 439/887 |
| 6,035,084 | A | * | 3/2000 | Haake et al. .................... 385/49 |
| 6,182,929 | B1 | * | 2/2001 | Martin et al. ................. 244/219 |
| 6,338,455 | B1 | * | 1/2002 | Rauch et al. ............. 244/134 D |
| 7,018,217 | B2 | * | 3/2006 | Marshall et al. .............. 439/67 |
| 7,281,318 | B2 | * | 10/2007 | Marshall et al. ............... 29/621 |
| 8,083,179 | B2 | * | 12/2011 | Hamilton et al. .......... 244/99.8 |
| 2006/0060690 | A1 | * | 3/2006 | Aisenbrey .................... 244/1 R |
| 2008/0185478 | A1 | * | 8/2008 | Dannenberg ................. 244/119 |

FOREIGN PATENT DOCUMENTS

| | | |
|---|---|---|
| GB | 649775 A | 1/1951 |
| GB | 1110217 A | 4/1968 |
| WO | 03/038841 A1 | 5/2003 |
| WO | 2007/136260 A1 | 11/2007 |

OTHER PUBLICATIONS

British Search Report for GB0909605.8 dated Oct. 2, 2009.

* cited by examiner

*Primary Examiner* — Valentina Xavier
(74) *Attorney, Agent, or Firm* — Hauptman Ham, LLP

(57) ABSTRACT

A fairing has a molded body and an electrical wire embedded therein. The body may be constructed from a molded plastics material or a composite material.

12 Claims, 4 Drawing Sheets

AIRCRAFT WIRE FAIRING

RELATED APPLICATIONS

Figure 1:
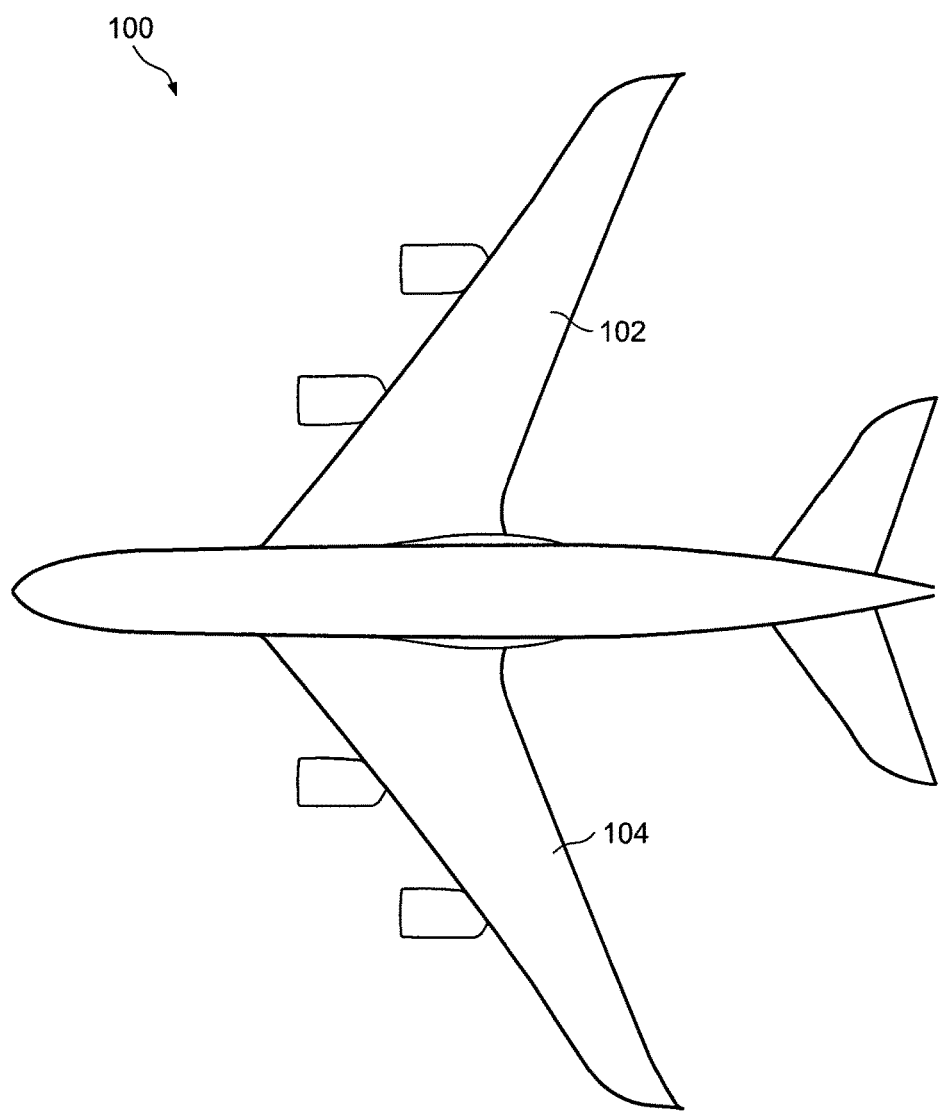

The present application is based on, and claims priority from, British Application Number 0909605.8, filed Jun. 4, 2009, the disclosure of which is hereby incorporated by reference herein in its entirety.

The present invention is concerned with an aircraft wire fairing. More particularly, the present invention is concerned with an aircraft wire fairing having an electrical wire embedded therein.

A large number of aircraft, in particular large passenger and commercial aircraft store fuel within their wings. Although this is an efficient use of space, it can cause problems because aviation fuel is extremely flammable.

Often, it is desirable to pass electrical wires across the wing of an aircraft, for example for fuel pumps or actuators. Such wires cannot pass through the wing itself because of the risk of arcing, which may ignite the fuel. Instead, wires are routed along the outer skin of the wing in fairings. Such fairings are designed to maintain an air gap between the wire and the wing skin. An air gap of several millimeters is desirable to prevent arcing across such a gap which may ignite the fuel. The fairings typically have an aerodynamic profile in order to reduce drag.

There are various problems with the existing fairing designs. The wire is normally held in place with a set of lips projecting from the inner surface of the fairing. There is a risk that under high accelerations the wire may become dislodged and move closer to the wing skin. Another problem with known fairings is that they are of a high aspect ratio, and require fixing to the aircraft wing at a large number of positions. Another problem is that the wire can generally move relative to the fairing, and vibrations may cause wear on the wire insulation. Another problem is that the fairing needs to be a certain size to provide an air gap sufficient to satisfactorily reduce the likelihood of arcing.

It is an aim of the present invention to provide an improved aircraft wire fairing.

According to a first aspect of the invention there is provided an aircraft fairing comprising a body defining an external surface of the fairing, the body having a power or data/signal wire at least partially embedded therein.

According to a second aspect of the invention there is provided a method of manufacture of an aircraft fairing comprising the steps of:
  providing a mould tool defining an external surface of a fairing,
  providing an electrical wire,
  positioning the electrical wire in the mould tool,
  introducing a mould material to produce a moulded fairing having an electrical wire at least partially embedded therein,
  removing the fairing from the mould tool.

By embedding the wire, its position is secured which prevents vibration damage and also keeps the wire at a fixed distance from the wing skin to inhibit arcing. Furthermore, the material of the body may be chosen to inhibit arc formation, in which case the fairing may be made smaller than a traditional air gap fairing. Also, as the fairing can be solid, it is structurally less flexible meaning fewer attachment points are required to attach it to the wing skin.

By "electrical wire" we mean a wire component configured for the carriage of electric current for power or data/signal transfer.

By "fairing" we mean an aerodynamic component projecting from the outer surface of an aircraft whose primary function is the reduction of drag of underlying components.

Figure 3:
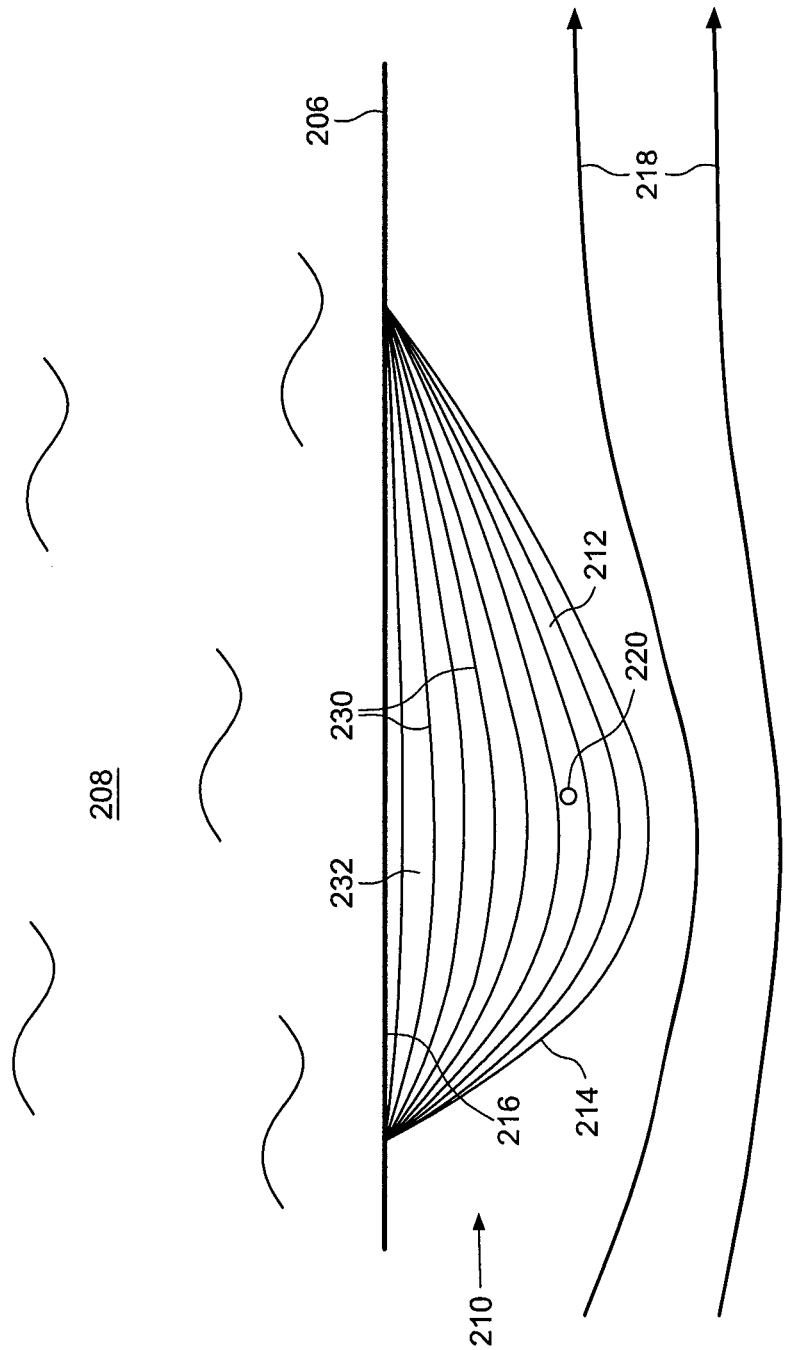
Figure 4:
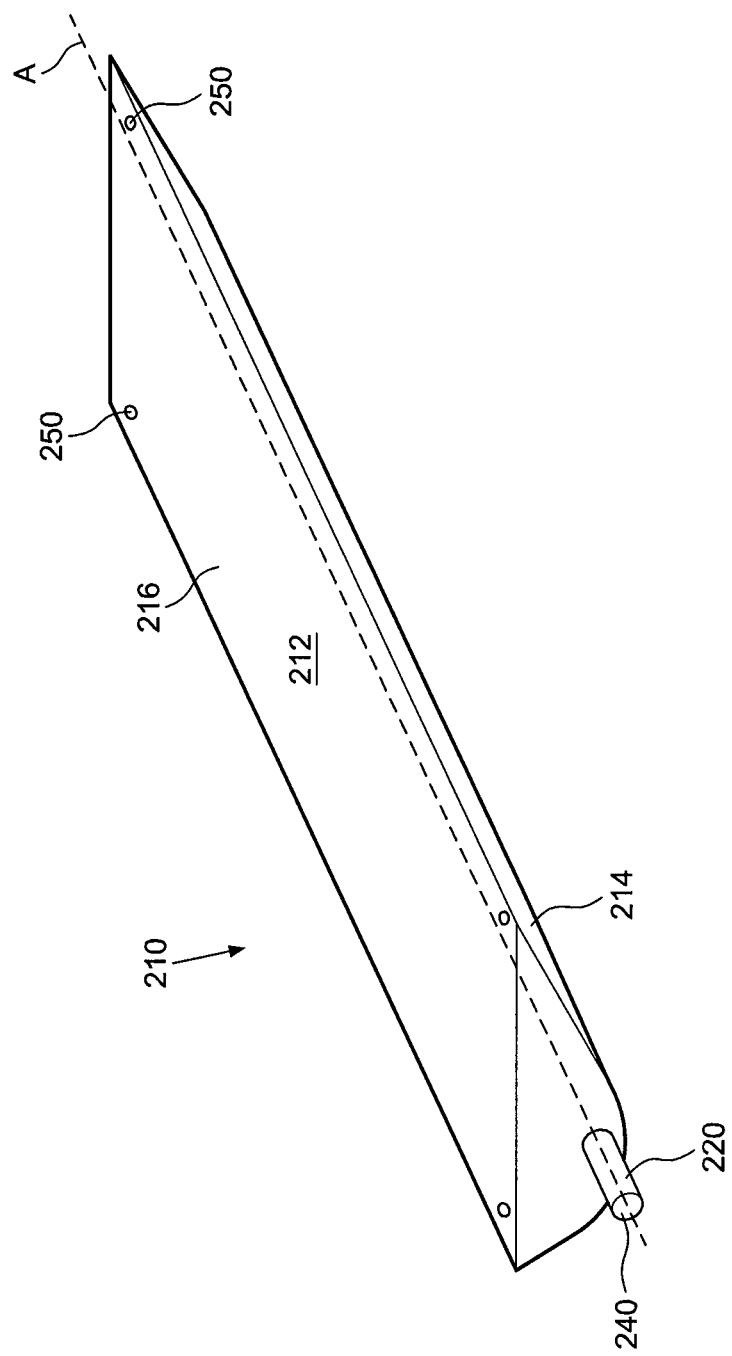

An example aircraft wire fairing will now be described with reference to the accompanying drawings in which:
  FIG. 1 is a plan view of an aircraft,
  FIG. 2 is a side section view of a first fairing in accordance with the present invention,
  FIG. 3 is a side section view of a second fairing in accordance with the present invention, and,
  FIG. 4 is a perspective view of the fairing of FIG. 3.

Referring to FIG. 1, a passenger aircraft 100 comprises a first wing 102 and a second wing 104. As is known in the art, the aircraft 100 stores fuel within the wings 102, 104 for use in flight.

Figure 2:
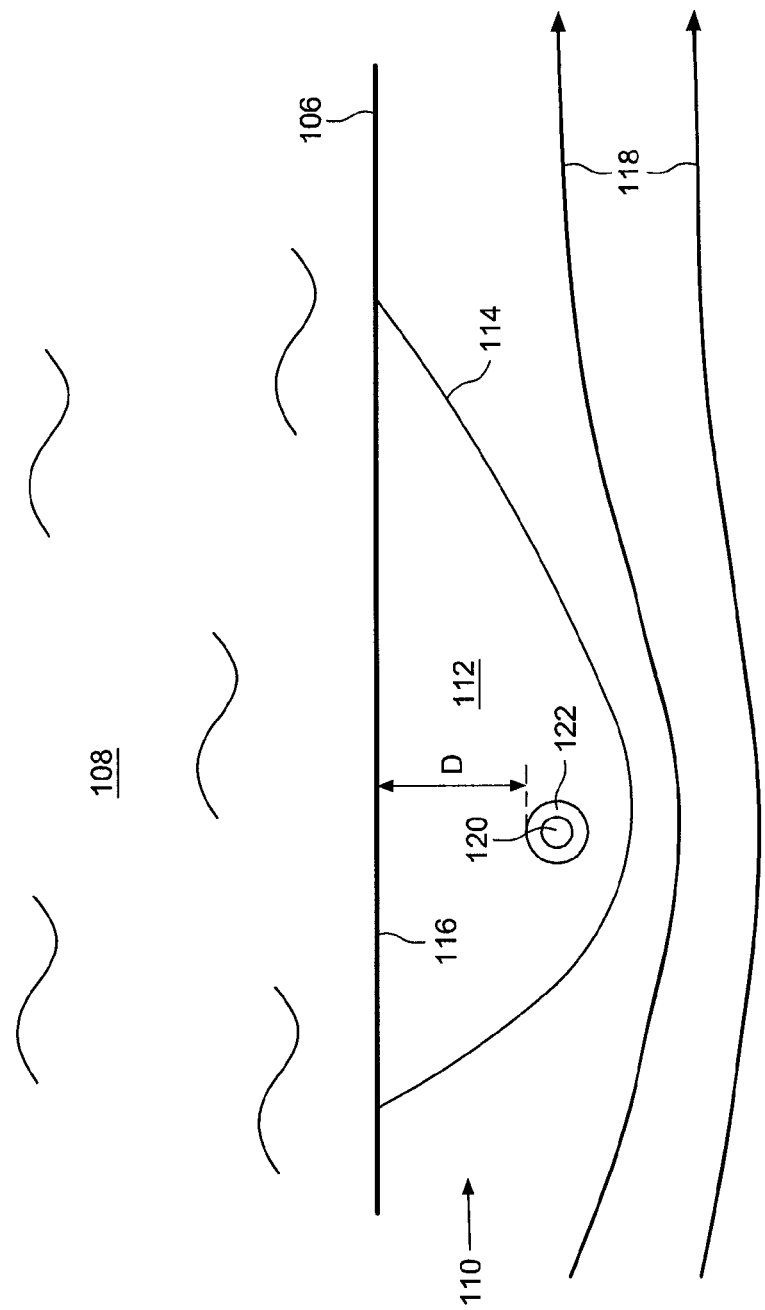

Referring to FIG. 2, a part of the skin 106 of the wing 102 is shown in section. Fuel 108 is situated behind the skin 106. It will be noted that the depiction of the skin 106 is schematic and it may comprise further structure and layers.

A wire fairing 110 is shown attached to the skin 106. The fairing comprises a moulded body 112 having an external surface 114 and a mounting surface 116. The body is constructed from a solid plastics material. The external surface 114 is shaped to be aerodynamic to reduce drag thereon when the aircraft is in flight, as depicted by streamlines 118.

An electrical wire 120 is provided embedded within the fairing 110. The wire 120 comprises an outer layer of insulation 122. The insulation may be electrical, thermal, or a combination of the two. The electrical wire 120 is completely surrounded by the fairing body 112, and is positioned closer to the external surface 114 than the mounting surface 116. This allows for a distance D to be established between the wire 120 and the wing skin 106 to prevent arcing and fuel ignition.

The fairing 110 may be manufactured by any known moulding technique, for example injection moulding. The wire 120 is positioned within the mould during manufacture so the plastics material of the body 112 flows around it to embed it in the fairing 110.

Turning to FIG. 3, reference numerals are 100 greater than those of FIG. 2 for all common parts. The fairing 210 is very similar to the fairing 110, except that the body 212 is a composite material comprising carbon fibre layers 230. The fibre layers 230 are embedded in a plastics matrix 232 with a known lay-up technique to form the body 212. The wire 220 is positioned between two of the layers 230 and is embedded within the matrix 232.

FIG. 4 shows the fairing 210. As can be seen, the body 212 is generally prismatic, having a main axis A parallel to its long side. The wire 220 is positioned parallel to the axis A and is exposed at either end of the fairing 210 with contacts 240. The contacts 240 are exposed for connection to an electrical input and output.

Attachment inserts 250 in the mounting face 216 allow the fairing 210 to be mounted to the wing skin 206.

Variations of the above embodiments fall within the scope of the present invention.

Multiple wires may be embedded in the fairing.

The wire 220, or a layer of wires may replace one of the layers 230.

The invention claimed is:
1. An aircraft fairing assembly comprising:
  an aircraft wing having a skin defining an external surface and a fuel tank disposed within the skin, and
  a fairing, distinct from the aircraft wing and comprising a body defining an aerodynamic external surface and a mounting surface, wherein the body is elongate, the body having at least one wire chosen from a power wire, a data wire, and a signal wire, the at least one wire is at least partially disposed within and extends along the elongate body;

wherein the mounting surface of the fairing is mounted to the external surface of the skin.

2. An aircraft fairing assembly according to claim 1 in which the body is constructed from a composite material.

3. An aircraft fairing assembly according to claim 2 in which the composite material comprises a plurality of fibre layers embedded in a matrix and the at least one wire is embedded in the matrix between two of the plurality of fibre layers.

4. An aircraft fairing assembly according to claim 1 in which the body is constructed from a plastics material.

5. An aircraft fairing assembly according to claim 1 in which the fairing is generally prismatic and in which the wire extends along a main axis of the fairing.

6. An aircraft fairing assembly according to claim 5 in which the fairing has a partial aerofoil profile cross-section.

7. An aircraft fairing assembly according to claim 1 comprising a first exposed electrical contact positioned at a first end of the at least one wire and a second exposed electrical contact positioned at a second end of the at least one wire.

8. An aircraft fairing assembly according to claim 1 comprising a mounting surface opposite the external surface, in which the at least one wire is embedded closer to the external surface than the mounting surface.

9. An aircraft fairing assembly according to claim 1 in which the at least one wire comprises a layer of electrical insulation.

10. A method of manufacture of an aircraft fairing assembly comprising the steps of:

providing an elongate mould tool defining an aerodynamic external surface and a mounting surface of a fairing, providing at least one wire chosen from a power wire, a data wire, and a signal wire, positioning the at least one wire in the mould tool to extend along the mould tool, introducing a mould material to produce an elongate moulded fairing having the at least one wire at least partially disposed within and extending along the fairing, removing the fairing from the mould tool, providing an aircraft wing having a skin defining an external surface, and a fuel tank disposed within the skin, mounting the mounting surface of the fairing to the external surface of the skin.

11. A method of manufacture of an aircraft fairing assembly according to claim 10 in which the step of introducing the mould material comprises the steps of:

laying up a fibre layer before positioning the at least one wire in the mould tool, laying up a further fibre layer after positioning the at least one wire in the mould tool, and, introducing a matrix material.

12. A method of manufacture of an aircraft fairing assembly according to claim 10 in which the step of introducing the mould material comprises the step of:

plastic injection moulding the fairing.

\* \* \* \* \*